US007206020B2

(12) United States Patent
Kato

(10) Patent No.: US 7,206,020 B2
(45) Date of Patent: Apr. 17, 2007

(54) ADAPTIVE WHITE DEFECT SIGNAL CORRECTION METHOD AND IMAGE-PICKUP APPARATUS USING THE METHOD

(75) Inventor: Akihiro Kato, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 840 days.

(21) Appl. No.: 10/230,418

(22) Filed: Aug. 29, 2002

(65) Prior Publication Data

US 2003/0043286 A1 Mar. 6, 2003

(30) Foreign Application Priority Data

Aug. 31, 2001 (JP) .............................. 2001-263811

(51) Int. Cl.
*H04N 9/64* (2006.01)

(52) U.S. Cl. ..................... 348/247; 348/250; 348/280

(58) Field of Classification Search ................ 348/241, 348/246, 247, 262, 272, 273, 280, 250
See application file for complete search history.

(56) References Cited

U.S. PATENT DOCUMENTS

| | | | | | |
|---|---|---|---|---|---|
| 5,144,446 | A | * | 9/1992 | Sudo et al. .................. | 348/246 |
| 5,381,175 | A | * | 1/1995 | Sudo et al. .................. | 348/246 |
| 5,796,430 | A | * | 8/1998 | Katoh et al. ................. | 348/246 |
| 5,805,216 | A | * | 9/1998 | Tabei et al. .................. | 348/246 |
| 6,683,643 | B1 | * | 1/2004 | Takayama et al. .......... | 348/247 |
| 6,707,493 | B1 | * | 3/2004 | Lee et al. .................... | 348/246 |
| 6,819,358 | B1 | * | 11/2004 | Kagle et al. ................. | 348/246 |
| 6,819,359 | B1 | * | 11/2004 | Oda ............................ | 348/247 |
| 2002/0149683 | A1 | * | 10/2002 | Post ............................ | 348/246 |

FOREIGN PATENT DOCUMENTS

| | | |
|---|---|---|
| JP | 61260772 | 11/1986 |
| JP | 03296374 | 12/1991 |
| JP | 06319082 | 11/1994 |
| JP | 07336602 | 12/1995 |
| JP | A-7-336605 | 12/1995 |
| JP | 08009264 | 1/1996 |
| JP | 10042201 | 2/1998 |
| JP | 11220661 | 8/1999 |

OTHER PUBLICATIONS

U.S. Appl. No. 09/917,705, filed Jul. 31, 2001.

* cited by examiner

*Primary Examiner*—Vivek Srivastava
*Assistant Examiner*—Chriss S. Yoder
(74) *Attorney, Agent, or Firm*—Mattingly, Stanger, Malur & Brundidge, P.C.

(57) ABSTRACT

An adaptive white defect correction method and an image-pickup apparatus implementing the method. Pixel data on lines located above and below a white defect pixel are judged according to a predetermined algorithm to determine which of a plurality of previously supposed kinds of pattern most resembles an image obtained near a white defect pixel. On the basis of a result of the determination, suitable interpolation data is generated. As for the determination of the image pattern, a pair of two pixels are selected from pixels on the lines located above and below the white defect pixel, and processing of determining whether there is correlation between pixel values of the selected pixels is repetitively executed until a image pattern near the white defect pixel is determined.

2 Claims, 4 Drawing Sheets

FIG.2

| X1 | X2 | X3 | X4 | X5 |
|----|----|----|----|----|
|    |    |    |    |    |
| Y1 | Y2 | Y3 | Y4 | Y5 |
|    |    |    |    |    |
| Z1 | Z2 | Z3 | Z4 | Z5 |

ADAPTIVE WHITE DEFECT SIGNAL CORRECTION METHOD AND IMAGE-PICKUP APPARATUS USING THE METHOD

CROSS-REFERENCE TO RELATED APPLICATIONS

This invention relates to patent application Ser. No. 09/917,705, filed on Jul. 31, 2001, assigned to the same assignee of the present invention, and entitled "METHOD OF DETECTING DEFECTIVE PIXELS OF A SOLID-STATE IMAGE-PICKUP DEVICE AND IMAGE-PICKUP APPARATUS."

BACKGROUND OF THE INVENTION

The present invention relates to an image-pickup apparatus. In particular, the present invention relates to a technique for making a defect part of an image caused by a white defect signal inconspicuous or less discernible as compared with its surrounding image when the white defect signal, which is a video signal having a high signal level, is output because of a defect that has occurred in solid-state image-pickup devices used in an image-pickup apparatus.

In conventional solid-state image-pickup devices (CCDs), an abnormal dark current flows according to a pixel associated with a photoelectric conversion device because of a crystal defect of a semiconductor. Depending upon a video signal output from such a defect pixel, a video signal portion having a high signal level is obtained because of a current value of the abnormal dark current. The portion becomes higher in luminance than the surrounding image, and its white color display stands out. This results in an image display error called pixel defect (hereinafter called white defect). The white defect becomes a cause of picture quality degradation.

As a method for effecting a correction in order to make the white defect inconspicuous, there is a method of previously detecting and recording position information of a detected defect pixel and signal level information of a white defect signal output from the defect pixel, and subtracting a signal level of the white defect signal from an output video signal of a CCD prior to A-D (analog to digital) conversion on the basis of the recorded information. In this method, only the white defect signal component is subtracted. Therefore, a correction can be effected so accurately that the corrected pixel will be hardly recognizable as corrected. On the other hand, it is necessary to accurately detect the white defect signal level. For example, if the white defect signal level is varied by the temperature or the like, therefore, it is necessary to calculate a value for subtraction from a CPU on occasion according to the variation. Furthermore, the above described detection processing is conducted by digital processing, and the correction is conducted by analog processing. This results in a problem that the circuit scale for the conversion becomes large.

Furthermore, recently, an interpolation scheme for conducting both the detection processing and the correction processing in a digital section is becoming the mainstream.

It is also conceivable to substitute a signal generated by simply averaging signals supplied from pixels surrounding a defect pixel for the white defect signal supplied from the defect pixel. Such a technique is disclosed in, for example, JP-A-7-336605. In this technique, however, it is not considered whether there is spatial correlation in an image picked up according to the present inventors' view. Therefore, it is considered that the obtained effect of white defect correction is limited.

SUMMARY OF THE INVENTION

Use of digital processing makes possible previous-value interpolation and upper-and-lower line interpolation. In the previous-value interpolation, a signal level of a normal pixel sampled at clock timing that precedes clock timing of a white defect signal by one pixel is substituted for a signal level in a position of a defect pixel. In the upper-and-lower line interpolation, a signal level corresponding to signal levels of pixels located above and below a white defect pixel is substituted for a a signal level in a position of a defect pixel by utilizing a line memory.

These simple previous-value interpolation and upper-and-lower line interpolation are based on a premise that an image picked up by an image-pickup apparatus has high spatial correlation. When an image having a high spatial frequency, such as an image like a resolution chart, is picked up, therefore, a signal corresponding to a signal supplied from a pixel that has no image correlation is substituted for a white defect signal of a defect pixel. Therefore, it has been found that an unnatural edge occurs at an image change point and the picture quality is degraded on the contrary in some cases. When the level of the white defect signal component is especially high, the white defect is slightly widened in the horizontal direction by filter processing preceding the A-D conversion. Therefore, it has been found that it is difficult to conduct sufficient interpolation on the widened portion.

An object of the present invention is to provide an image-pickup apparatus capable of correcting a white defect pixel so as to make it little conspicuous.

Another object of the present invention is to provide an image-pickup apparatus that makes even a solid-state image-pickup device having a pixel defect usable.

Still another object of the present invention is to provide an image-pickup apparatus capable of sufficiently correcting a white defect signal of a high level even when the white defect is widened in the horizontal direction by filter processing preceding the A-D conversion processing.

Yet another object of the present invention is to provide a white defect signal correction method for adaptively correcting a white defect signal.

In accordance with one aspect of the present invention, an image-pickup apparatus includes a separator for providing a plurality of different monochromatic radiation images obtained by spectral separating a light incident on the image-pickup apparatus, solid-state image-pickup devices provided respectively for the plurality of monochromatic radiation images, each of the solid-state image-pickup devices conducting photoelectric conversion on a monochromatic radiation image received by a plurality of photoelectric conversion elements each of which forms a pixel and outputs a video signal, a video signal processing circuit connected to the solid-state image-pickup devices, and white defect correction circuits respectively connected to the solid-state image-pickup devices and the video signal processing circuit to adaptively correct a white defect signal supplied from the solid-state image-pickup devices and supply the corrected signal to the video signal processing circuit. The white defect correction circuits generate an interpolation signal according to an image pattern located near a defect pixel relating to the white defect signal, and substitute the generated interpolation signal for at least the white defect signal.

Preferably, the image pattern may be detected on the basis of video signal levels of pixels located on an upper scanning line and/or a lower scanning line with respect to a first horizontal scanning line on which the defect pixel exists.

Preferably, in the case of a white defect having a high level, pixels preceding or subsequent to the white defect may also be corrected by altering changeover timing for substituting the interpolation signal for the white defect signal of the defect pixel to become timing including pixels preceding or subsequent to the defect pixels. Either an interpolation signal generated on the basis of video signal levels of pixels located on the upper or lower horizontal scanning line or a previous-value interpolation signal, which is a video signal value of a pixel immediately preceding the defect pixel, may be substituted for the white defect signal according to the detected pattern.

Preferably, an interpolation signal generated on the basis of video signal levels of pixels located on the upper or lower horizontal scanning line, and a previous-value interpolation signal may be added with predetermined ratios. A resultant interpolation signal may be used to prevent changeover of interpolation data at the time of an image pattern change from causing a brightness changing state like flashing.

In accordance with another aspect of the present invention, a method for correcting a white defect signal caused by a pixel defect of a solid-state image-pickup device in an image-pickup apparatus includes the steps of judging pixel data on lines located above and below a white defect pixel and determining, according to a predetermined algorithm, which of a plurality of previously supposed kinds of pattern most resembles an image obtained near a white defect pixel, and generating suitable interpolation data based on a result of the determination. The determining step includes the step of selecting a pair of two pixels from pixels on the lines located above and below the white defect pixel and determining whether there is correlation between pixel values of the selected pixels, and the step of repetitively executing the step of selecting and determining until a image pattern near the white defect pixel is determined.

Preferably, the step of selecting and determining may include the step of determining whether a difference between pixel values of the two selected pixels is equal to or less than a predetermined threshold.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram showing how codes of 5 by 5 pixels around a pixel Y3 to be detected are set;

DESCRIPTION OF THE EMBODIMENTS

Figure 1:
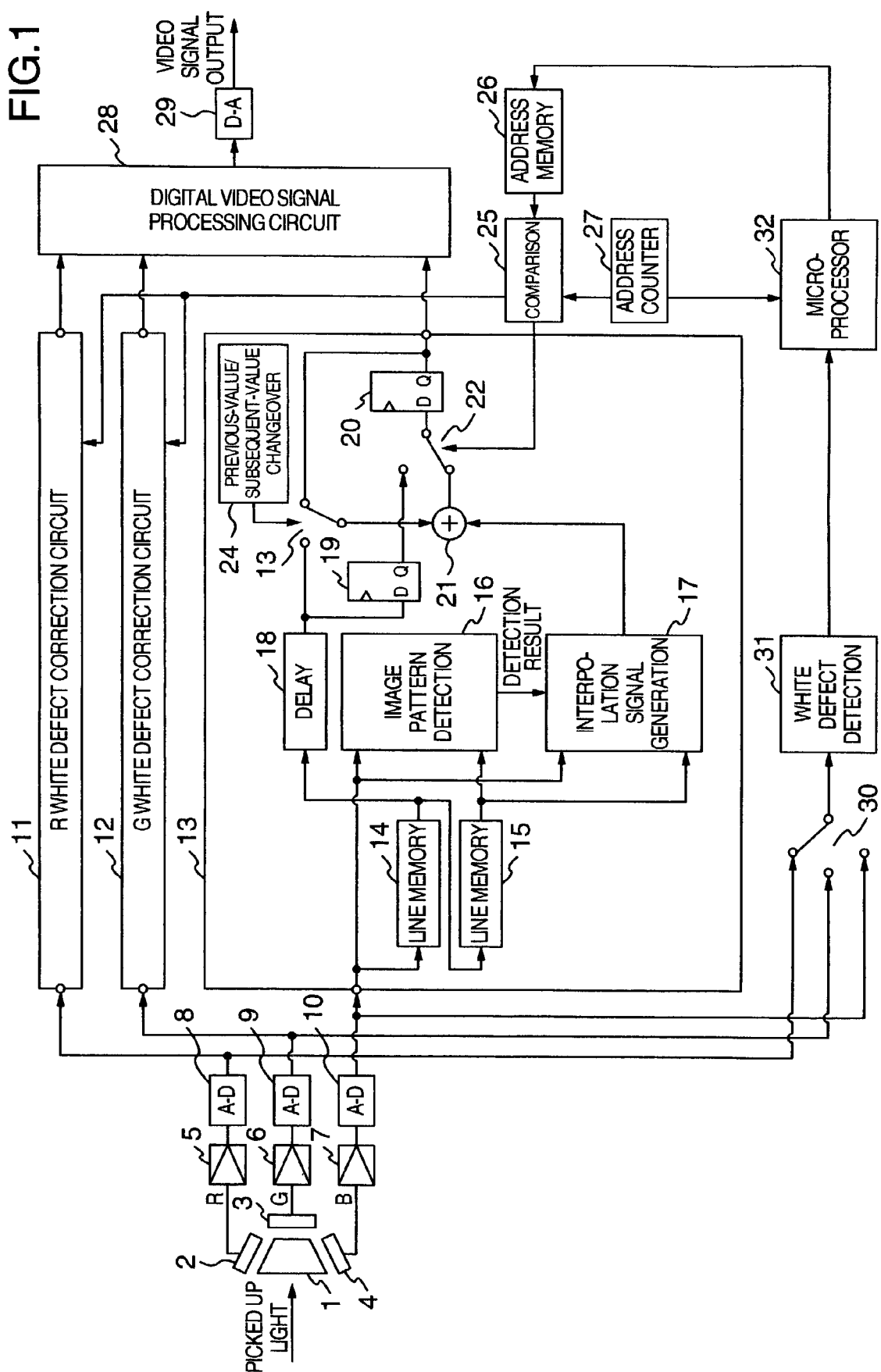
FIG. 1 is a block configuration diagram of an embodiment of an image-pickup apparatus according to the present invention.

Hereafter, embodiments of the present invention will be described with reference to the drawings. Similar components are denoted by like reference characters.

FIG. 1 is a block configuration diagram of an embodiment of an image-pickup apparatus according to the present invention. In FIG. 1, picked-up light is passed through a lens (not illustrated), and then separated into three primary colors of red (R)/green (G)/blue (B) by a prism 1 and subjected to photoelectric conversion in solid-state image-pickup devices (CCDs) 2 to 4. Video signals of an R channel, a G channel, and a B channel obtained by the photoelectric conversion are respectively input to white defect correction circuits 11 to 13 via preamplifier circuits 5 to 7 for conducting signal amplification, and A-D converters 8 to 10 for converting analog signals to digital signals, respectively. In FIG. 1, an internal configuration of the white defect correction circuit 13 for the B channel is shown for the purpose of description. Each of the white defect correction circuits 11 and 12 also has a similar configuration.

Figure 4:
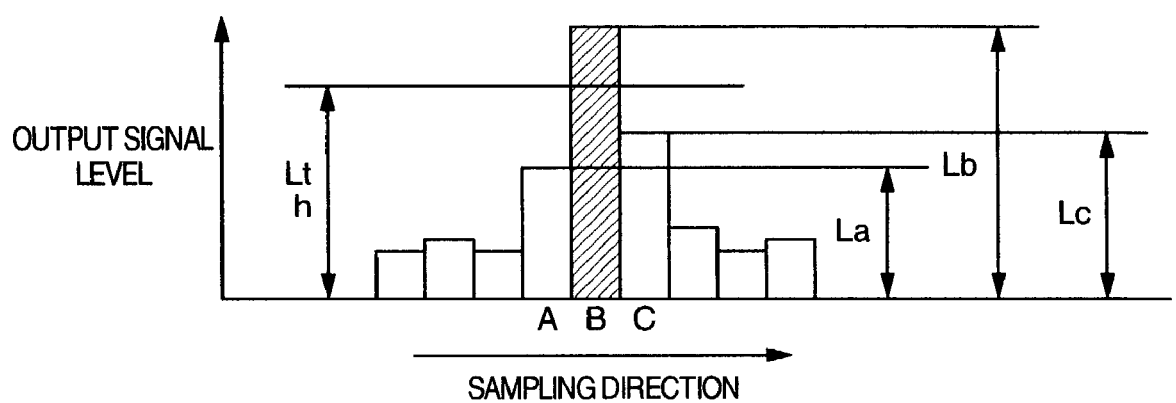
FIG. 4 is a diagram showing a white defect decision criterion in a white defect detection method according to the present invention.

First, a method for detecting a white defect will now be described. Detection is conducted in an off-line state in which light is intercepted before CCDs by, for example, closing lens irises. A switch 30 selects a video signal of one channel from video signals of respective channels after the A-D conversion and supplies the video signal to a white defect detection section 31. The white defect detection section 31 conducts all-pixel sampling on the output signal of CCDs over one frame period by using registers A, B and C corresponding to three pixels. Thereby, the white defect detection section 31 conducts level comparison on output signal levels (pixel values) La, Lb and Lc respectively of the registers A, B and C. In addition, the white defect detection section 31 sets a detection threshold level Lth for discriminating between ordinary noise and a white defect. And when the conditions Lb>La, Lb>Lc and Lb>Lth are satisfied as shown in FIG. 4, the white defect detection section 31 judges a pixel (shaded portion) sampled in the register B to be a white defect.

As for a white defect having a comparatively low level, however, the original white defect cannot be detected in some cases by setting the detection threshold level alone, because the level difference between the white defect and noise is small. In addition to the above described method, therefore, there is conducted storage operation with a readout period of the CCD video signal lengthened to several tens times of the ordinary operation. Since white defects appearing in fixed positions are accumulated and noise occurring in random positions is averaged, the level difference between the white defect and noise becomes large and the white defect detection precision can be improved.

With respect to a pixel thus judged to be a white defect, its level information is sent to a microprocessor 32. The microprocessor further reads position information of the white defect from an address counter 27. On the basis of those kinds of information, the microprocessor creates the address for white defect correction and level data, and sends the information to a memory 26.

In some cases, solid-state image-pickup devices are supplied from a manufacturer together with data of white defect pixels.

The white defect correction circuit 13 first conducts delay processing by using line memories 14 and 15 for delaying the input video signal by a horizontal scanning interval (H) so as to take out a signal obtained by delaying the sampling signal before delay processing by 1H and a signal obtained by delaying the sampling signal before delay processing by 2H. Considering the signal delayed by 1H as a center, the sampling signal before delay processing can be regarded as a signal located above the center by one line. The signal delayed by 2H can be regarded as a signal located below the center by one line. Hereafter, the signal delayed by 1H is treated as a line signal including a signal of a pixel to be corrected in white defect, unless otherwise stated.

The signal level (pixel value) located above the white defect pixel by one line and the signal level (pixel value) located below the white defect pixel by one line are input to an image pattern detection circuit 16. The image pattern detection circuit 16 conducts level comparison for determining an interpolation signal to be substituted for a white defect signal of the defect pixel.

Figure 2:
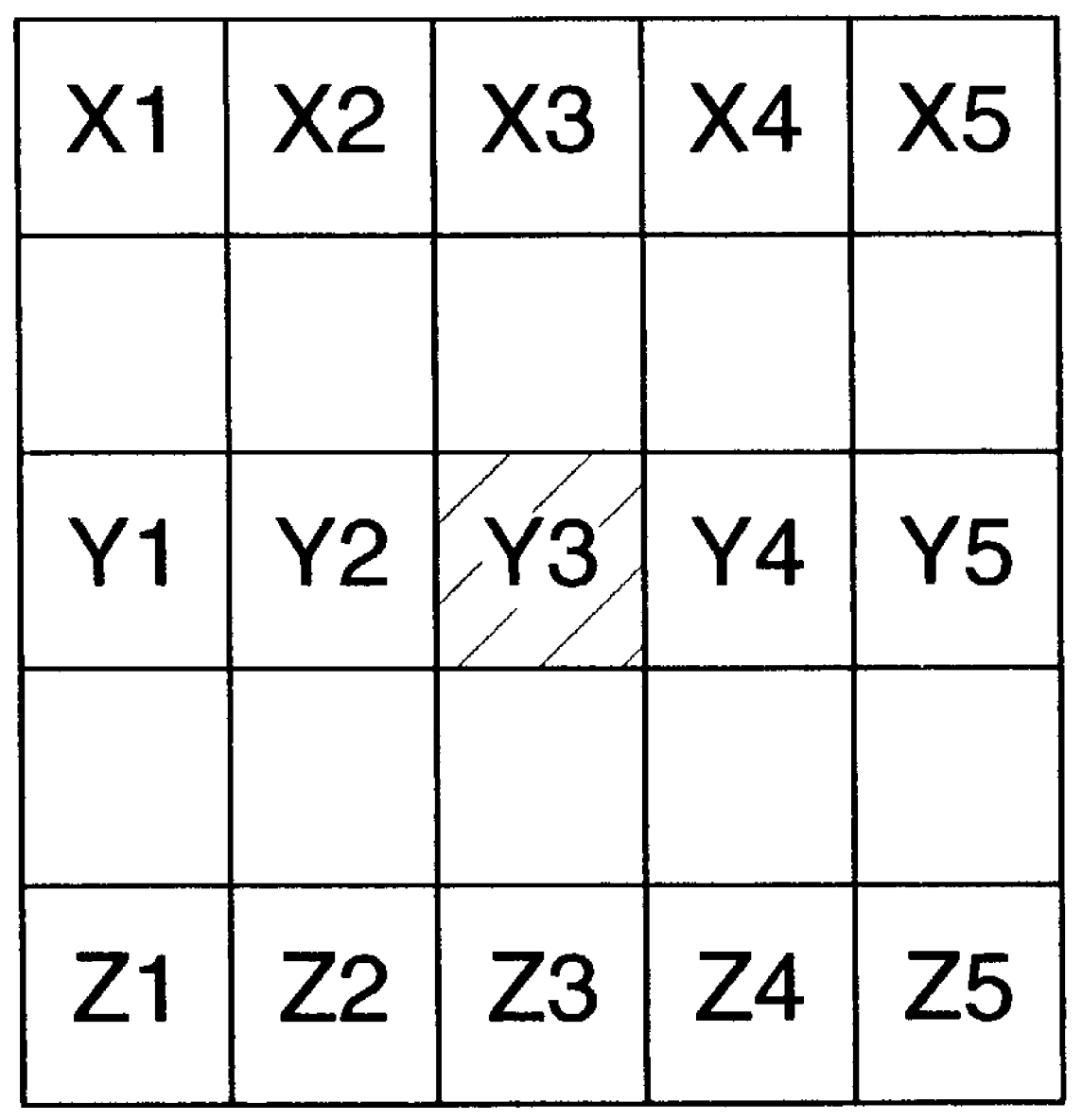

Its pattern detection is conducted on a region of 5 by 5 pixels around a pixel Y3 to be detected as shown in FIG. 2. Pixels located on the same line are denoted by characters having the same prefix letter like X1 and X2. The line including the pixel Y3 to be detected is provided with a prefix letter Y. A line that is 1H ahead of the line including the pixel Y3 is provided with a prefix letter X. On the other hand, a line that is 1H behind the line including the pixel Y3 is provided with a prefix letter Z. As for the horizontal direction, pixels are respectively provided with numbers 1 to 5 in the order of sampling in the A-D converters. The pixel to be detected is denoted by Y3. The reason why an interval between the line of X and the line of Y is 1H and an interval between the line of Y and the line of Z is 1H is that the embodiment of the present invention is described for the case where the CCD scanning system is the interline (interlace) system. It is a matter of course that the present invention can be applied to the progressive system as well.

Figure 3:
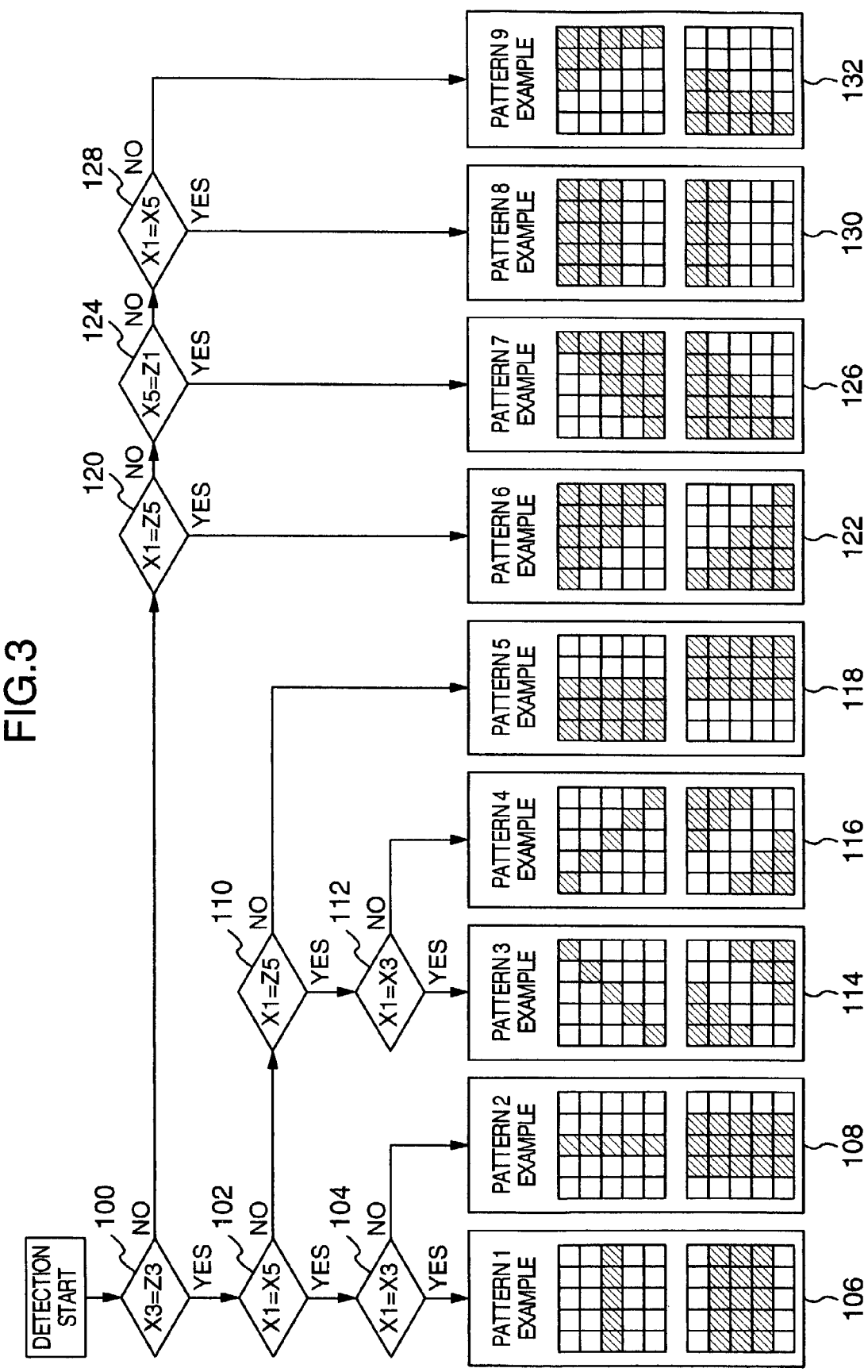
FIG. 3 is a flow chart showing an algorithm of a pattern detection scheme for selecting correction data in the present invention.

A pattern detection flow will now be described with reference to FIG. 3. Here, in order to classify the image pattern in the 5×5 pixel region into one of nine patterns to be described later, level comparison between pixels in the region of 5 by 5 pixels is conducted by using comparison of a total of five kinds: (X3, Z3) (which means comparison between a signal level of a pixel X3 and a signal level of a pixel Z3. Hereafter, the same notation is used.); (X1, X5); (X1, X3); (X1, Z5); and (X5, Z1). Signal levels of pixels Y1 to Y5 are not subjected to level comparison. The reason will now be described. As for the white defect pixel and pixels sampled before and after it, a video signal output from those pixels is filtered by low pass filters before the A-D conversion. As a result, the video signal waveform is blunted or dulled. If there is a defect pixel in the line Y, therefore, the signal level of the white defect signal is degraded. If signals of pixels of the Y line degraded in signal level are used, accurate level comparison cannot be conducted. That is the reason why the signal levels of the pixels Y1 to Y5 are not subjected to level comparison. Therefore, pixel levels of the pixels Y1 to Y5 including the white defect pixel are predicted from pixel levels of a total of six pixels X1, X3, X5, Z1, Z3 and Z5.

First, in order to check symmetry of the image pattern in the vertical direction, comparison (X3, Z3) between pixels located just over and just under the pixel Y3 to be corrected is conducted (step 100). In the notation in FIG. 3, "=" does not represent comparison for determining whether output signal levels of pixels are equal, but represents comparison for determining whether correlation in output signal level between pixels is strong. In the present embodiment, optimum thresholds are independently set for R, G and B channels according to signal-to-noise ratios and storage time of the CCDs 2 to 4. A difference in signal level between pixels to be compared in level, i.e., between pixels X3 and Z3 in this case is calculated. When the difference is smaller than its threshold, the correlation in signal level between the pixels X3 and Z3 is judged to be strong, and it is denoted by "=".

If the correlation in signal level between the pixels X3 and Z3 is judged to be strong as a result of the level comparison of (X3, Z3) conducted at the step 100, then level comparison of (X1, X5) is conducted (step 102). By making sure that there is symmetry in the vertical direction by means of the level comparison (X3, Z3) and then conducting the level comparison of (X1, X5), there is checked symmetry of the line Y of the pixels Y1 to Y5 accurate pixels levels of which cannot be detected because of the white defect signal.

If the correlation in signal level between the pixels X1 and X5 is judged to be strong as a result of the level comparison of (X1, X5) at the step S102 and consequently symmetry in both the vertical and horizontal directions is made sure, then level comparison of (X1, X3) is conducted to determine whether the pixel Y3 to be corrected belongs to a part of an image pattern in the horizontal direction or belongs to a part of an image pattern in the vertical direction (step 104). If the correlation is strong, then the pattern is classified as pattern 1 (step 106). If the correlation is not recognized, then the pattern is classified as pattern 2 (step 108).

If the correlation in signal level between the pixels X3 and Z3 is judged to be strong as a result of the level comparison (X3, Z3) conducted at the step 100, but the correlation in signal level between the pixels X1 and X5 is judged not to be strong as a result of the level comparison (X3, Z3) conducted at the step 102, then level comparison of (X1, Z5) is conducted (step 110). If the correlation in signal level between the pixels X1 and Z5 is judged to be strong as a result of the level comparison (X1, Z5) conducted at the step 110, then level comparison of (X1, X3) is conducted (step 112). If the correlation is strong, then the pattern is classified as pattern 3 (step 114). If the correlation is not recognized, then the pattern is classified as pattern 4 (step 116). If the correlation in signal level between the pixels X1 and Z5 is judged not to be strong as a result of the level comparison (X1, Z5) conducted at the step 110, then the pattern is classified as pattern 5 (step 118).

If the correlation in signal level between the pixels X3 and Z3 is judged not to be strong as a result of the level comparison (X3, Z3) conducted at the step 100, then level comparison of (X1, Z5) is conducted (step 120). If the correlation in signal level between the pixels X1 and Z5 is judged to be strong as a result of the level comparison (X1, Z5) conducted at the step 120, then the pattern is classified as pattern 6 (step 122). On the other hand, if the correlation in signal level between the pixels X1 and Z5 is judged not to be strong, then level comparison of (X5, Z1) is conducted (step 124). If the correlation in signal level between the pixels X5 and Z1 is judged to be strong as a result of the level comparison (X5, Z1) conducted at the step 124, then the pattern is classified as pattern 7 (step 126). On the other hand, if the correlation in signal level between the pixels X5 and Z1 is judged not to be strong, then level comparison of (X1, X5) is conducted (step 128). If the correlation in signal level between the pixels X1 and X5 is judged to be strong as a result of the level comparison (X1, X5) conducted at the step 128, then the pattern is classified as pattern 8 (step 130). On the other hand, if the correlation in signal level between the pixels X1 and X5 is judged not to be strong, then the pattern is classified as pattern 9 (step 132).

As heretofore described, the image pattern around the pixel to be corrected is finally classified into one of the following nine patterns by selecting two pixels from among the pixels X1 to X5 and the pixels Z1 to Z5, comparing levels of the two pixels with each other, and checking the strength of image correlation in the horizontal direction, the vertical direction and the slant direction.

Pattern 1 . . . (X3=Z3) (X1=X5) (X1=X3),
Pattern 2 . . . (X3=Z3) (X1=X5) (X1≠X3),
Pattern 3 . . . (X3=Z3) (X1≠X5) (X1=Z5) (X1=X3),
Pattern 4 . . . (X3=Z3) (X1≠X5) (X1=Z5) (X1≠X3),
Pattern 5 . . . (X3=Z3) (X1≠X5) (X1≠Z5),
Pattern 6 . . . (X3≠Z3) (X1=Z5)
Pattern 7 . . . (X3≠Z3) (X1≠Z5) (X5=Z1),
Pattern 8 . . . (X3≠Z3) (X1≠Z5), (X5≠Z1) (X1=X5),
Pattern 9 . . . (X3≠Z3) (X1≠Z5), (X5≠Z1) (X1≠X5)

Subsequently, selection of interpolation data serving as the interpolation signal is conducted according to each of the nine patterns as experimented data. For example, in the case of the pattern 1, correlation between pixels on the same line is strong, but correlation in the vertical direction is weak. Therefore, interpolation is not conducted by using a pixel on the upper or lower line, but the previous-value interpolation is conducted by using a signal level of the pixel Y2 shown in FIG. 2 as the interpolation signal. In the case of the pattern 2, correlation between pixels on the same line is weak, but correlation in the vertical direction is strong. Therefore, the upper-and-lower line interpolation is conducted by using an average value of signal levels of the pixels X3 and Z3. According to the pattern, the following data is used for interpolation of the white defect pixel Y3.

Pattern 1 . . . Y2,
Pattern 2 . . . <X3, Z3>,
Pattern 3 . . . <X5, Z1>,
Pattern 4 . . . <X1, Z5>,
Pattern 5 . . . <X3, Z3>,
Pattern 6 . . . <X1, Z5>,
Pattern 7 . . . <X5, Z1>,
Pattern 8 . . . Y2,
Pattern 9 . . . <X1, X5, Z1, Z5>

Here, <X3, Z3> represents an average value of signal levels of the pixels X3 and Z3. Even if three or more pixels are interposed between <and >, an average value is represented in the same way. If any correlation is not recognized as a result of all level comparison operations, an average value of signal levels of four pixels X1, X5, Z1 and Z5.

Description will now be made of an exemplary circuit for realizing a white defect correction by using interpolation data which are different for respective correlation patterns with reference to FIG. 1.

Interpolation data for the above-explained patterns 1 and 8 are obtained by one sample delaying the signal level of the pixel immediately preceding the white defect pixel by using the flip-flop 20 (i.e., the previous-value interpolation). Interpolation data for patterns other than the patterns 1 and 8 are obtained by averaging the upper and lower line signals obtained from the line memory 14 and the line memory 15, respectively, by using the interpolation signal generating circuit 17 (i.e., the upper-and-lower line interpolation). One interpolation data is selected out of these interpolation data in accordance with the image pattern to substitute for the white defect pixel data to thereby implement the white defect correction. Under practical use condition, however, the previous-value interpolation and the upper-and-lower line interpolation are not completely switched, but the previous-value interpolation data is added to the upper-and-lower line interpolation data by a ratio of for example 25% or 50% so that the sum of the interpolation data makes a 100% interpolation signal. The reason for this is explained.

Generally, the video signal of the camera is always fluctuating due to noise and the like. Due to such, when the level of the difference between pixels to be compared in the correlation detection fluctuates near the threshold level of the correlation pattern detection, the interpolation data is frequently switched, causing the interpolated pixel value to be greatly changed depending on the peripheral pattern, which sometimes results in blinking of the corresponding pixel position which is conspicuous. In view of such, a component of the previous-value interpolation is always added at a certain ratio to reduce the switching shock that would otherwise be caused by switching the interpolation signal.

An interpolation signal thus obtained is substituted for the signal level of the white defect pixel via a delay circuit 18 provided to compensate time required for the image pattern detection and interpolation signal selection. As for timing of the substitution, address information of the memory 26 containing a previously detected white defect address, a level and a channel (R/G/B) is correlated in a comparator 25 with an output of an address counter 27, which counts a sampling clock. A changeover switch 22 is turned on at timing of coincidence. During the on-time, the interpolation signal is input from the adder 21 to the flip-flop 20. The above described "white defect address" means a horizontal coordinate and a vertical coordinate that represent a position of a white defect on a solid-state image-pickup device such as a CCD. The "level" means a difference voltage between a white defect pixel and normal pixels measured when light is intercepted before the CCD. In a white defect, the dark current is larger than in normal pixels, and consequently the CCD output voltage becomes higher than in normal pixels. As for the "channel," the image-pickup apparatus described herein receives three primary colors (R, G and B) separated by the prism, by using three independent CCDs, and the "channel" represents which CCD the white defect exists in.

In the case where the white defect signal level is comparatively low, it suffices to conduct interpolation only at the time of coincidence with the white defect address. If the white defect signal level becomes high, degradation of the white defect extends over adjacent pixels on the same line in some cases. If at this time interpolation is conducted only at the time of address coincidence, then pixels remain degraded and components of the white defect remain, resulting in incomplete interpolation. Therefore, the white defect signal level is also stored individually together with the address beforehand, and the on-time period of the changeover switch 22 is extended according to the white defect signal level. For example, if the white defect signal level is high and degradation of the white defect extends over two pixels ahead of the white defect pixel and two pixels behind the white defect pixel, then the changeover switch 22 is turned on two sampling periods before the coincidence of the white defect address and turned off two sampling periods after the coincidence of the white defect address. By doing so, correction becomes possible even in the case where the white defect has spread in the horizontal direction. As the correction range becomes wide, however, the correlation in the horizontal direction is weakened by the previous value interpolation component. As for interpolation of last one sampling period of the correction interval, therefore, a switch 23 is changed over to a signal before being input to a flip-flop 19, by a previous value/subsequent value changeover circuit 24. Thus there is conducted subsequent-value interpolation using pixel data that are not affected by the white defect and that are located subsequently in time.

The video signal subjected to white defect correction is subject to gradation correction, color tone correction, and contour compensation in a video signal processing circuit 28 of a subsequent stage, then encoded to a video format, and output from the video camera via a D-A converter 29.

According to the embodiment, white defect pixels can be corrected so as to be little conspicuous by automatically using the interpolation using pixel data on the upper and lower lines, the previous-value interpolation, and the subsequent-value interpolation according to an image pattern surrounding the pixel to be corrected. Furthermore, by selecting five sets of pixels from pixels of the upper and lower lines, conducting level comparison, providing them with priorities, and conducting classification into several patterns, it becomes possible to select pixels having strong correlation and conduct interpolation.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An image pickup apparatus comprising:

at least one solid state image pickup device for converting an incident light into a video signal, said solid state image pickup device constructed by a plurality of photoelectric conversion elements including a defect pixel which generates a white defect signal;

a video signal processing unit, coupled to said solid state image pickup device, for processing said video signal;

a white defect detection unit, coupled to said solid state image pickup device, for detecting said white defect signal from said video signal and generating position information of said defect pixel; and a white defect correction unit, coupled with said solid state image pickup device, through which said video signal is supplied to said video signal processing unit, for correcting said white defect signal, wherein said white defect correction unit comprising:

an image pattern detection unit for detecting an image pattern in a predetermined pixel region which comprises a plurality of pixels including said defect pixel, an interpolation signal generation unit for generating an interpolation signal based on said image pattern, and a substituting unit, coupled with said interpolation signal generation unit, for substituting said white defect signal to said interpolation signal, wherein when a signal level of said white defect signal is higher than a predetermined value, an activating unit for activating said white defect correction unit with respect to each of outputs of a predetermined number of pixels formed of the defect pixel and one or more pixels preceding and subsequent to said defect pixel, wherein for each of pixels ranging from a first pixel to a second last pixel in the predetermined number of pixels, said white defect correction unit generates a signal by adding an interpolation signal generated for the pixel and a video signal of a pixel immediately preceding the pixel with predetermined ratios, and substitutes the generated signal for a video signal of the pixel, and wherein for a last pixel in the predetermined number of pixels, said white defect correction unit generates a signal by adding an interpolation signal generated for the last pixel and a video signal of a pixel immediately following the last pixel with predetermined ratios, and substitutes the generated signal for a video signal of the last pixel.

2. An image-pickup apparatus comprising:

a separator for separating a plurality of different monochromatic radiation images, to which an incident light is entered;

a plurality of solid-state image-pickup devices received respectively for said plurality of monochromatic radiation images, each of said solid-state image-pickup devices conducting photoelectric conversion on a monochromatic radiation image received by a plurality of photoelectric conversion elements including a defect pixel which generates a white defect signal, each of which outputs a video signal;

a video signal processing unit coupled to said solid-state image-pickup devices; and a white defect detection unit, coupled to said solid state image pickup devices, respectively, for detecting said white defect signal from said video signal and generating position information of said defect pixel; and a plurality of white defect correction units, coupled with said solid state image pickup devices, through which said video signals are supplied to said video signal processing unit, for correcting said white defect signal, wherein said white defect correction unit comprising:

an image pattern detection unit for detecting an image pattern in a predetermined pixel region which comprises a plurality of pixels including said defect pixel, an interpolation signal generation unit for generating an interpolation signal based on said image pattern, and a substituting unit, coupled with said interpolation signal generation unit, for substituting said white defect signal to said interpolation signal, wherein when a signal level of said white defect signal is higher than a predetermined value, an activating unit for activating said white defect correction unit with respect to each of outputs of a predetermined number of pixels formed of the defect pixel and one or more pixels preceding and subsequent to said defect pixel, wherein for each of pixels ranging from a first pixel to a second last pixel in the predetermined number of pixels, said white defect correction units generate signals by adding an interpolation signal generated for the pixel and a video signal of a pixel immediately preceding the pixel with predetermined ratios, and substitute the generated signal for a video signal of the pixel, and wherein for a last pixel in the predetermined number of pixels, said white defect correction units generate signals by adding an interpolation signal generated for the last pixel and a video signal of a pixel immediately following the last pixel with predetermined ratios, and substitute the generated signal for a video signal of the last pixel.

* * * * *